United States Patent
Ishikawa et al.

(10) Patent No.: US 6,398,252 B1
(45) Date of Patent: Jun. 4, 2002

(54) SENSOR SUPPORT ASSEMBLY FOR VEHICLES

(75) Inventors: Kazuo Ishikawa; Toshikazu Kamiya; Takaki Ogawa; Masakatsu Suzuki, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/166,376

(22) Filed: Oct. 5, 1998

(30) Foreign Application Priority Data

Oct. 6, 1997 (JP) .............................. 9-272927

(51) Int. Cl.⁷ .................................................. B60P 1/43
(52) U.S. Cl. ..................................... 280/727; 280/728.2
(58) Field of Search ................................. 280/735, 727, 280/728.2, 731, 5, 514; 180/282; 379/448; 359/823; 273/371

(56) References Cited

U.S. PATENT DOCUMENTS

| | | | | |
|---|---|---|---|---|
| 4,700,385 A | * | 10/1987 | Disimone | 379/448 |
| 4,995,639 A | * | 2/1991 | Breed | 280/735 |
| 5,007,661 A | * | 4/1991 | Lenzen | 280/735 |
| 5,178,409 A | * | 1/1993 | Hiramitsu et al. | 280/731 |
| 5,291,014 A | * | 3/1994 | Brede et al. | 280/735 |
| 5,453,638 A | | 9/1995 | Nägele et al. | |
| 5,510,937 A | * | 4/1996 | Mogamiya | 359/823 |
| 5,511,750 A | * | 4/1996 | Evenson | 248/200 |
| 5,895,071 A | * | 4/1999 | Norton | 280/735 |
| 5,988,646 A | * | 11/1999 | Fair | 273/371 |

FOREIGN PATENT DOCUMENTS

| | | | |
|---|---|---|---|
| EP | 0 481 806 A | 4/1992 | |
| EP | 0 777 124 A | 6/1997 | |
| JP | 58-211903 | 12/1983 | ............ B60G/9/02 |
| JP | 6-265569 | 9/1994 | ........... G01P/15/02 |
| JP | 7-112657 | 5/1995 | ............ B60T/8/34 |
| JP | 8-211089 | 8/1996 | ........... G01P/15/03 |
| JP | 09058996 | 3/1997 | |
| JP | 9-159689 | 6/1997 | |

* cited by examiner

*Primary Examiner*—Lanna Mai
*Assistant Examiner*—Hau Phan
(74) *Attorney, Agent, or Firm*—Morgan & Finnegan, LLP

(57) ABSTRACT

An assembly for mounting a sensor, which measures a running state of a vehicle, on the vehicle at a predetermined positional relationship to the vehicle. The assembly includes a control unit for controlling the vehicle based on a signal transmitted from the sensor and a circuit board. The assembly further includes a case to be fixed to the vehicle for housing the circuit board and a holding member for holding the sensor at an inclination relative to the circuit board. The holding member maintains the positional relationship between the sensor and the vehicle when the case is fixed to the vehicle.

27 Claims, 4 Drawing Sheets

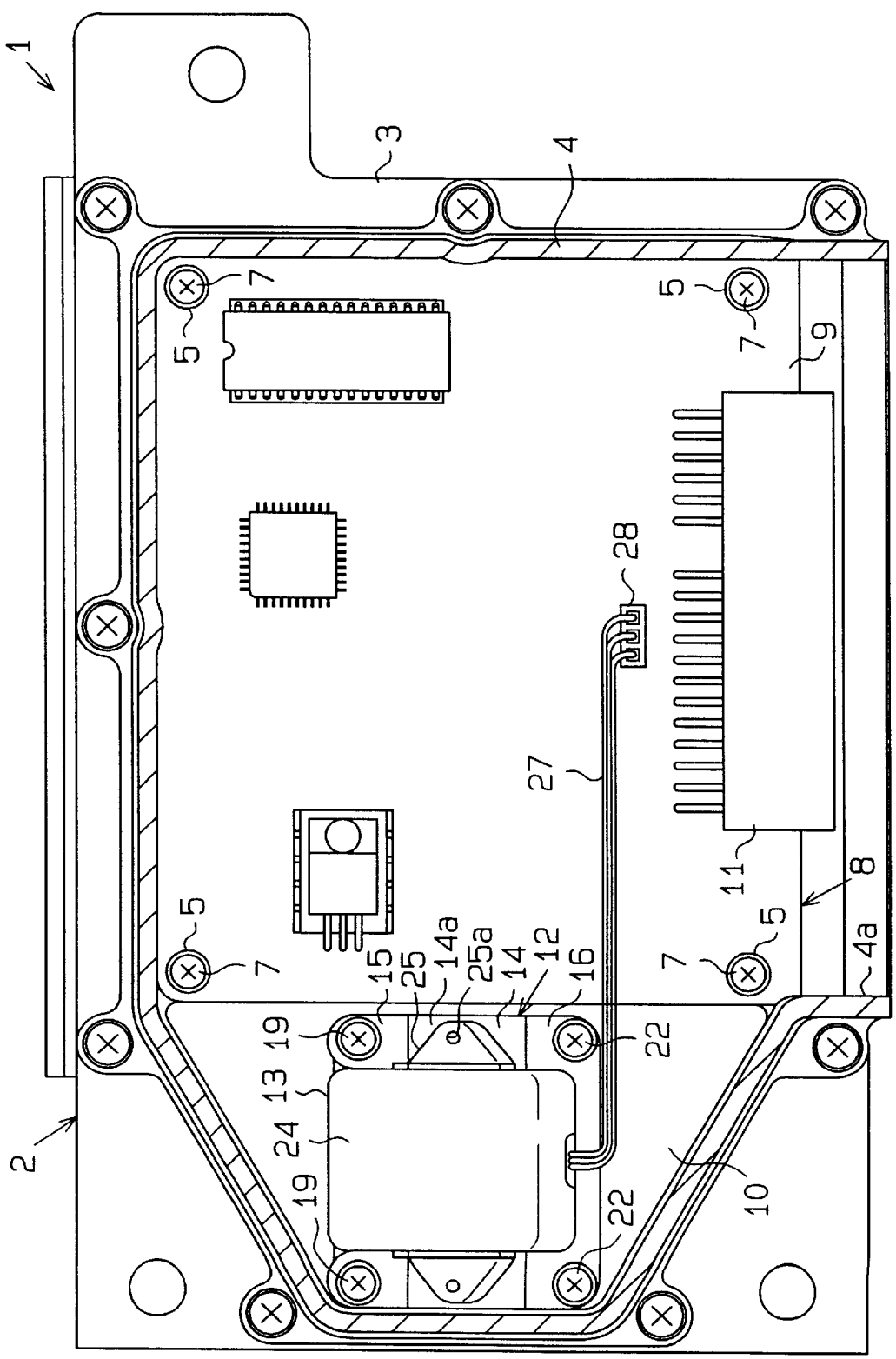

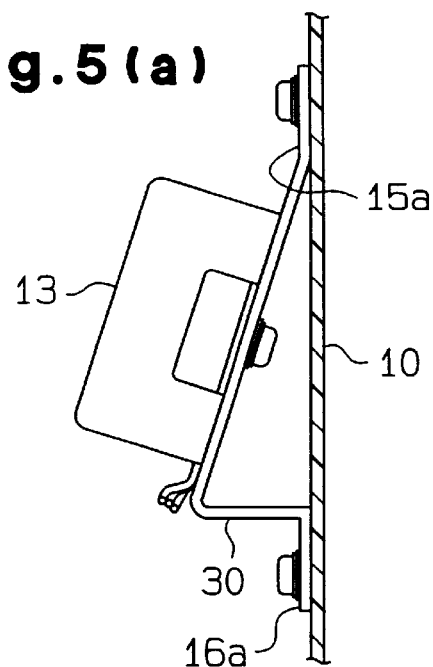
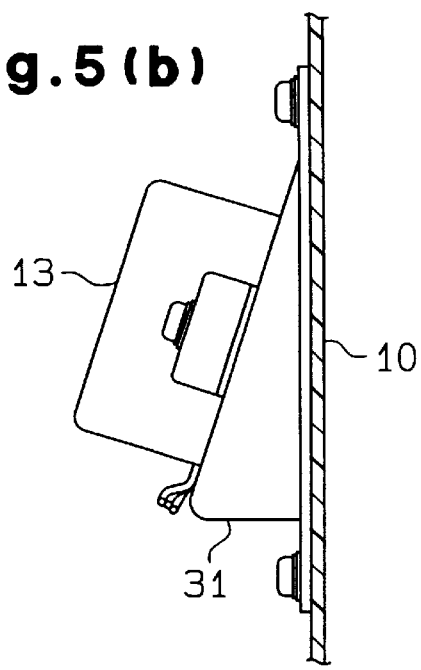
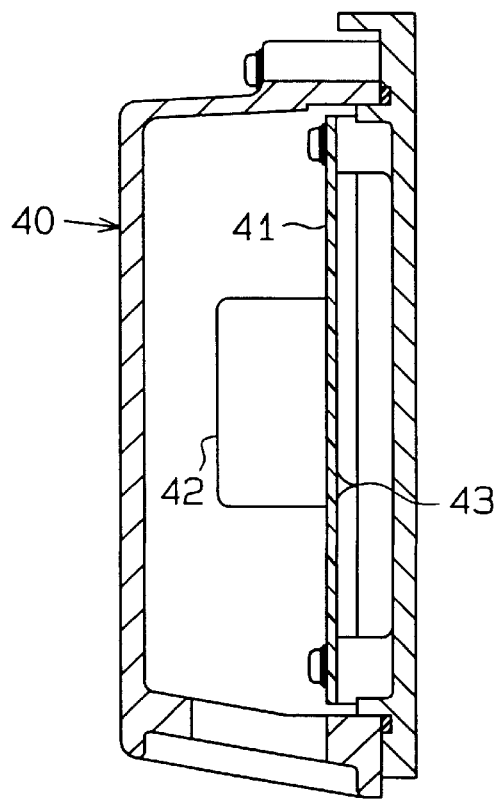
Fig.6 (Prior Art)

SENSOR SUPPORT ASSEMBLY FOR VEHICLES

BACKGROUND OF THE INVENTION

1. Field of the Invention

The present invention relates to a sensor, and more particularly to a mounting structure for a sensor that measures the running state of an industrial vehicle, such as a fork-lift truck.

2. Description of the Prior Art

Prior art fork-lift trucks have tiltable axles for improving riding quality and running stability. However, when a load on the fork is relatively heavy, when the vertical position of the load on the fork is relatively high, or when the fork-lift truck makes a high speed turn, the running stability of the fork-lift truck is decreased due to tilting motion of the axle. An apparatus for locking the axle to prevent the tilting motion of the axle relative to the body frame in these situations has been proposed. The apparatus includes a sensor for measuring the yaw rate or lateral acceleration (centrifugal force) of the vehicle. The apparatus further includes a lock mechanism for locking the tilting motion of the axle when the yaw rate or the lateral acceleration exceeds a predetermined value.

For example, the yaw rate sensor utilizes a piezoelectric vibrational gyroscope or a fiber-optic gyroscope. When the measured yaw rate or the lateral acceleration, which is calculated based on the measured yaw rate and the speed of the fork-lift truck, exceeds a predetermined value, the lock mechanism will be activated. The lock mechanism has dampers that are arranged between the body frame and the axle. When the dampers are locked, tilting of the axle is prohibited. As a result, the vehicle is stabilized.

In general, accuracy of the sensor is affected by the way the sensor is mounted. If the sensor is improperly mounted on the vehicle, the accuracy of the sensor will be low. In the case of a yaw rate sensor having a gyroscope, the axis of the gyroscope must be parallel to the vehicle's turning axis, which is vertical. That is, the axis of the sensor should be vertically fixed on the vehicle. In a case of the acceleration sensor, the direction of the acceleration to be measured should be parallel to the moving direction of the vehicle.

However, it is sometimes difficult to provide enough space for mounting the sensor, so the sensor is not always properly mounted. Moreover, typically, such sensors are not water-proof and dust-proof. Therefore, the additional space required for a water and dust proof structure would further limit the available mounting space.

One way to mount the sensor on the vehicle is to mount the sensor directly on the vehicle body. In this proposal, the sensor is covered by a water and dust proof cover, and a control unit is accommodated in a water and dust proof metal case. The control unit has an electric circuit for controlling the tilting motion of the axle. The sensor, which is mounted on the vehicle body, is electrically connected to the control unit, which is separated from the sensor, with a wire harness.

In this proposal, the sensor unit is relatively small, so that the attitude and position of the sensor unit on the vehicle are not substantially restricted. Therefore, the sensor can be mounted on the vehicle even if the mounting space is small. Furthermore, the axis of the sensor can be vertically fixed. However, since the harness that connects the sensor and the control unit is positioned outside of the cases, the harness is easily cut, so the electrical connection is unreliable.

Another way to mount the sensor on the vehicle is to put both the sensor and the control unit in a common case. In this instance, as shown in FIG. 6, a circuit board 41, which has an electric circuit on it, is housed in the case 40 of the control unit. The sensor 42 is directly mounted on the board 41. A terminal 43 is provided on the sensor 42. The terminal 43 is soldered to an electrode (not shown) of the board 41. The sensor 42 is thus electrically connected to the control unit.

In this instance, the sensor 42 is directly mounted on the board 41, so the electrical connection is not exposed. However, the case 40 is relatively large, so the attitude and the location of the sensor 42 on the vehicle is restricted. Therefore, the operational axis of the sensor 42 may not be perfectly vertical when the sensor 42 is mounted on the vehicle.

Furthermore, the sensor 42 is relatively heavy in comparison with other circuitry parts, so the solder, which connects the terminal 43 and the electrode of the board, is susceptible to breakage due to vibrations.

SUMMARY OF THE INVENTION

An objective of the present invention is to provide an improved support assembly for a sensor that measures a running state of a vehicle.

Another objective of the present invention is to provide a sensor support assembly that achieves a more reliable electrical connection between the sensor and a circuit board.

Another objective is to provide a sensor support assembly that uses existing parts, thus reducing costs.

For achieving the objectives of the present invention, an assembly is provided for mounting a sensor that measures a running state of a vehicle on the vehicle. The sensor is mounted with a predetermined orientation. The assembly includes a control unit for controlling the vehicle based on a measured signal transmitted from the sensor. The control unit includes a circuit board. The assembly further includes a case to be fixed to the vehicle for housing the circuit board and a holding member for holding the sensor at an angle relative to the circuit board. The holding member maintains the orientation of the sensor with respect to the vehicle when the case is fixed to the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objectives and advantages thereof, may best be understood by reference to the following description of the present preferred embodiments together with the accompanying drawings in which:

FIG. 2 is a cross-sectional view of the assembly of FIG. 1;

FIG. 5(a) is a longitudinal sectional view, showing another embodiment of the sensor mounting assembly;

FIG. 5(b) is a longitudinal sectional view, showing further embodiment of the sensor mounting assembly; and FIG. 6 is a longitudinal sectional view of a prior art sensor mounting structure.

DETAILED DESCRIPTION OF THE PREFERRED EMBODIMENTS

A first embodiment of the present invention will be described with reference to FIGS. 1 to 4.

Figure 1:
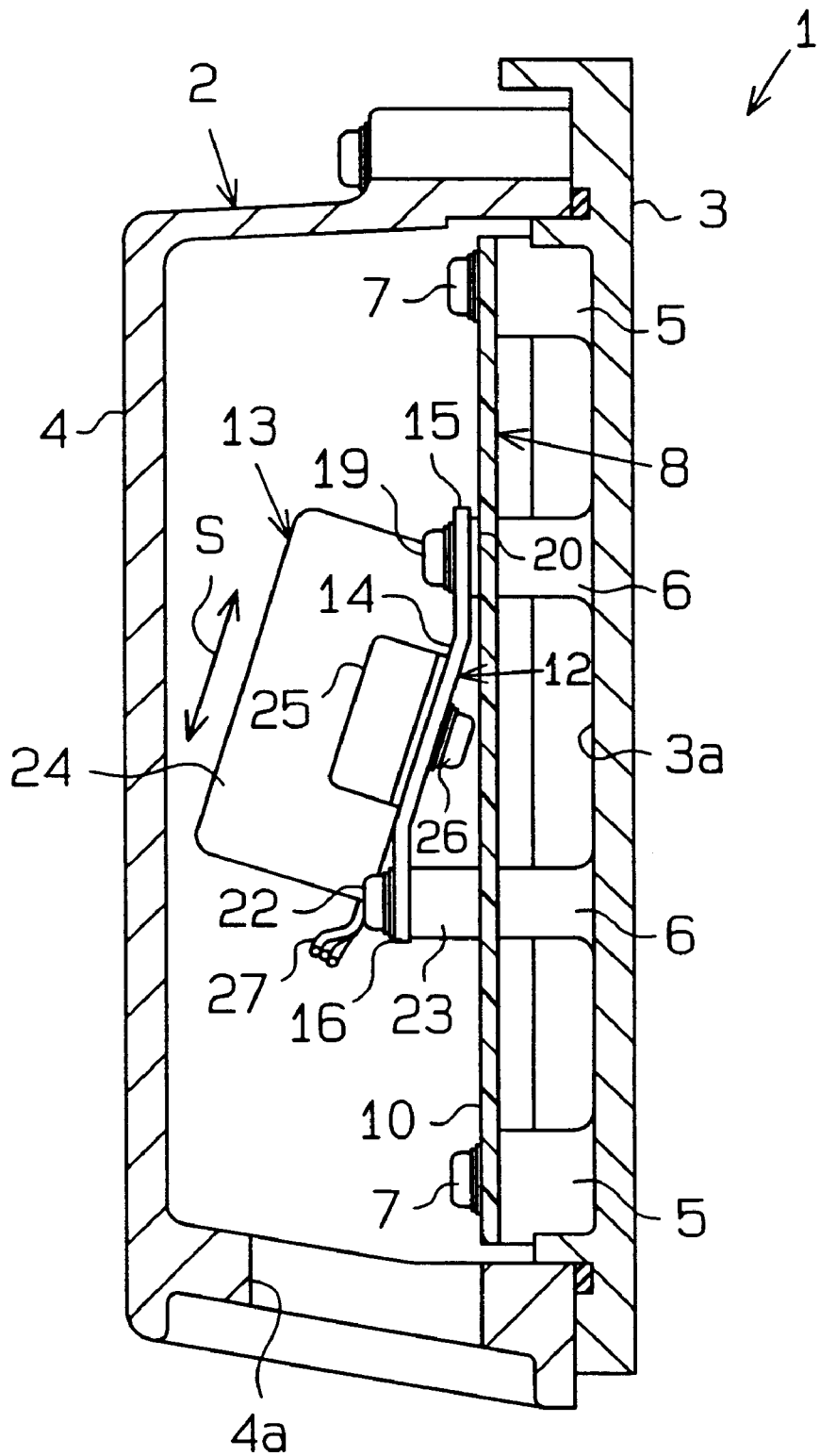
FIG. 1 is a longitudinal cross sectional view of a sensor mounting assembly in accordance with the present invention.

As shown in FIG. 1, a sensor mounting assembly 1 is protected by a water and dust proof case 2. The case 2 is formed by, for example, aluminum alloy and is fixed to a vehicle. The case 2 includes a base 3, which is fixed to the vehicle, and a cover 4, which is fixed to the base 3. An inner surface of the cover 4 and a recess 3a of the base 3 define a sensor accommodating space. First pedestals 5 and second pedestals 6 extend from the recess 3a and are integrally formed with the base 3. The first and second pedestals 5 and 6 have the same length. Furthermore, the first and second pedestals 5 and 6 have a female threaded hole (not shown) at their distal ends for attaching a circuit board 8 to the pedestals 5 and 6. The circuit board 8 is fixed to each of the first and second pedestals 5 and 6 by screws 7, 19 and 22.

As shown in FIG. 2, the circuit board 8 includes first and second parts 9 and 10. The first part 9 is supported on the first pedestals 5. The first part 9 is preferably an existing circuit board, which was used in the prior art. The second part 10 is supported on the second pedestals 6 adjacent to the first part 9. An electric circuit is provided on the first part 9. The electric circuit controls a lock mechanism for locking the tilting motion of an axle of the vehicle. A connector 11 for electrically connecting the electric circuit to the lock mechanism is provided on the first part 9. The second part 10 provides an area for mounting a sensor 13. The sensor 13 is mounted on the second part 10 with a bracket 12 and spacers 20 and 23.

Figure 3A:
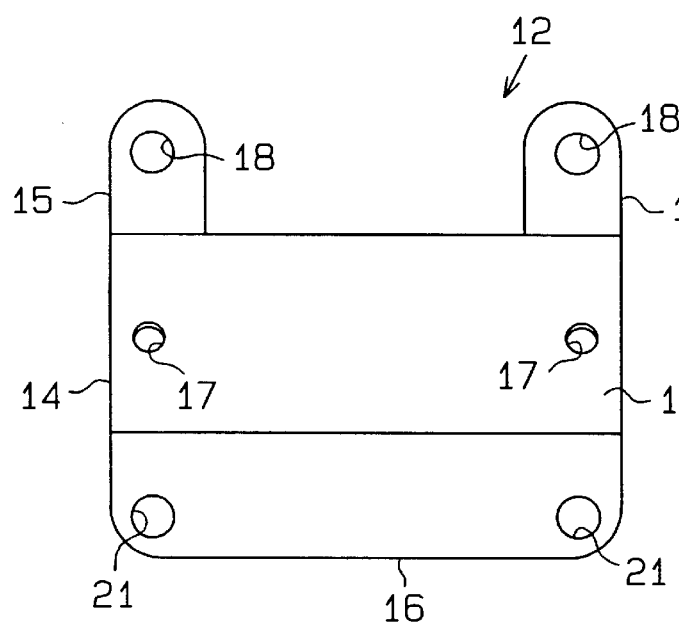
FIG. 3(a) is a plan view of a bracket.
Figure 3B:
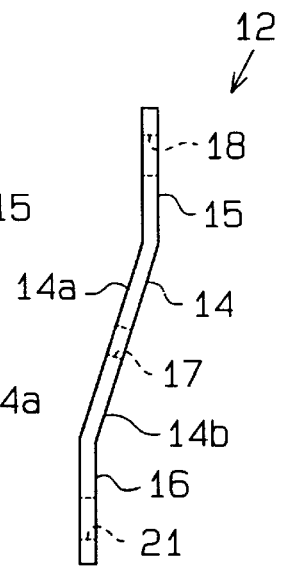
FIG. 3(b) is a side view of the bracket of FIG. 3(a)

The bracket 12 is formed by press molding a metal plate. As shown in FIGS. 3(a) and 3(b), the bracket 12 is bent. A plate 14 of the bracket 12 supports the sensor 13 on its top surface 14a. Two holes 17 extend through the plate 14 for mounting the sensor 13 on the top surface 14a of the plate 14. Two first mounting pieces 15 and one second mounting piece 16 are formed on the bracket 12 to fix the bracket 12 to the second part 10. The first and second mounting pieces 15 and 16 are planar. The first mounting pieces 15 extend from first end of the plate 14 at a predetermined angle relative to the plate 14. The first mounting pieces 15 are parallel with each other. The second mounting piece 16 extends from a second end, which is opposite to the first end, of the plate 14 at an equal but opposite angle to that of the first mounting pieces 15 relative to the plate 14 as shown in FIG. 3(b). The mounting piece 16 extends in a direction that is opposite to that of the first mounting pieces 15. Therefore, each first mounting piece 15 is parallel to and offset from the second mounting piece 16. The first mounting pieces 15 and the second mounting piece 16 are separated by the plate 14.

A through hole 18 is formed in each first mounting piece 15. A screw 19 is inserted through each hole 18, through a spacer 20 and through a hole in the second part 10. Each screw 19 is then screwed into the threaded hole of the corresponding second pedestal 6. Through holes 21 are formed in the second mounting piece 16. A screw 22 is inserted through each hole 21, through a spacer 23, and through a hole in the second part 10. Each screw 22 is then screwed into the threaded hole of the corresponding second pedestal 6. Therefore, the plate 14 is fixed to the circuit board 8 while the top surface 14a of the plate 14 is inclined relative to the second part 10 at a predetermined angle.

The sensor 13 has a main body 24 and mounting ears 25, which are formed on opposite sides of the main body 24. A threaded hole 25a is formed in each mounting ear 25. A screw 26 is inserted through each hole 17 from the rear surface 14b of the plate 14 to engage with the corresponding threaded hole 25a of the mounting ear 25. The sensor 13 is thus fixed to the bracket 12. An arrow S shown in FIG. 1 indicates the direction of an operational axis, which is defined in the sensor 13. The sensor 13 measures the yaw rate based on a deflection from the operational axis. The operational axis extends parallel to the top surface 14a and is inclined relative to the rear surface of the base 3.

Lead wires 27 are connected to an input/output terminal (not shown) of the sensor 13. The connection between the input/output terminal of the sensor 13 and the lead wire 27 is sealed by synthetic resin. The lead wire 27 has a connector 28 at its distal end. The connector 28 is connected to a socket provided on the first part 9. As a result, the sensor 13 is electrically connected to the electric circuit arranged on the first part 9.

The cover 4, shown in FIGS. 1 and 2, is fixed to the base 3. The cover 4 has an opening 4a. The connector 11 is accessible from outside of the case 2 through the opening 4a. The opening 4a allows wires to extend between the connector 11 and an axle tilt control mechanism located outside of the assembly 1.

Figure 4:
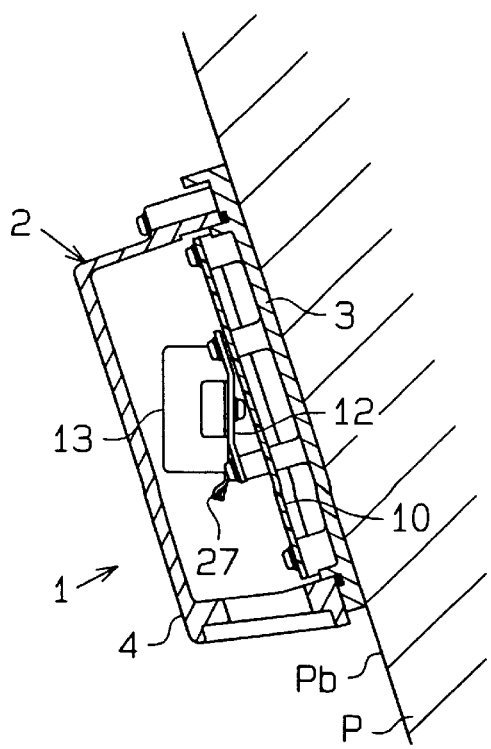
FIG. 4 is a cross-sectional view like FIG. 1 of the assembly mounted on the vehicle.

In the first embodiment, the assembly 1 is fixed to the vehicle body while the top surface 14a of the assembly 1 is inclined at the predetermined angle, as shown in FIG. 4. In this position, the operational axis of the sensor 13 is vertical (assuming the vehicle is level).

Functions and operation of the mounting structure of the sensor will now be described.

For example, as shown in FIG. 4, the assembly 1 can be fixed to a rear surface Pb of a front protector P of the. fork-lift truck. The rear surface Pb is inclined. The slope of the top surface 14a of the bracket 12 is defined based on the inclination of the rear surface Pb. When the assembly 1 is fixed to the rear surface Pb, the top surface 14a is vertical, and thus the axis of the sensor 13 is also vertical. Therefore, the sensor 13 can accurately measure the yaw rate of the vehicle while the vehicle is making a turn. The assembly 1 transmits a control signal to control the tilting motion of the axle based on the measured yaw rate. The lock mechanism is operated based on the control signal. Therefore, the tilting motion of the fork-lift truck is adequately controlled.

The mounting structure of the sensor in the vehicle in accordance with this embodiment provides following advantages.

(a) The sensor 13 is fixed to the case 2 with the second part 10, the bracket 12 and the spacers 21 and 23. These parts hold the sensor 13 at desired mounting attitude. Thus, the sensor 13 is fixed to the vehicle at the desired attitude.

(b) The first and second parts 9 and 10 are arranged on the circuit board 8. The sensor 13 is fixed to the second part 10 by the bracket 12 and the spacers 21 and 23. Therefore, the case 2 can be made thinner. As a result, there are fewer limitations on the mounting location.

(c) The bracket 12 is made with a simple metal plate, so the bracket 12 can be easily manufactured, for example, by press molding.

(d) Since the assembly 1 of the preferred embodiment incorporates a pre-existing circuit board part 9, the cost of the assembly 1 is lower than if a new circuit board were designed.

(e) The present invention relates to the mounting structure of the sensor 13, which measures the yaw rate while the vehicle is making a turn, so the yaw rate is measured accurately. The mounting structure is part of the apparatus for locking the axle of the fork-lift truck, so the axle of the fork-lift truck is controlled with high accuracy.

The present invention is not limited to the above embodiment of FIG. 1 and can be modified as follows.

The bracket 12 may be replaced with a bracket 30, which has a V shaped cross section as shown in FIG. 5(a). In this instance, the spacers 21 and 23 are not required, so the numbers of the parts and the manufacturing steps are reduced. In this embodiment, planar mounting pieces 15a and 16a lie in the same plane.

The bracket 12 or 30 need not be manufactured by press molding a metal plate. The bracket 12 or 30 can be manufactured by other means.

As shown in FIG. 5(b), a bracket 31 having a triangular prism shape, which is produced by metal casting or metal forging, may be employed. In this instance, the spacers 21 and 23 are not required, so the numbers of the parts and manufacturing steps are reduced.

The bracket 12, 30, 31 can be manufactured from other than metal materials, such as synthetic resin or ceramics.

The bracket 12 can have a mechanism for changing the inclination of the sensor mounting surface of the bracket 12 relative to the case 2. In this instance, the sensor 13 can be held by the same bracket 12 even if the mounting position of the case 2 on the vehicle is changed.

The first and second parts 9 and 10 can be integrated in the same board. That is, there may be only one circuit board.

The lead wire 27 can be soldered to the electrode terminal on the first part 9 instead of the input/output terminal of the sensor. Even in this construction, the possibility of cutting the wire is reduced, and the reliability of the connection is increased, since large forces caused by vibration of the sensor 13 are not applied to the soldered part.

The input/output terminal can be integrally formed on the sensor 13, and the input/output terminal can be soldered to the second part 10.

The present invention is not limited to the mounting structure of the sensor 13, which measures the yaw rate. For example, the present invention can be applied to a mounting structure of an acceleration sensor, which measures the acceleration of the vehicle in the moving direction of the vehicle. A control apparatus controls the braking force or the engine speed based on the speed calculated from the measured acceleration.

The present invention is not limited to fork-lift trucks. The present invention can be applied to a mounting structure of a sensor 13 that measures the yaw rate of, for example, a shovel loader or a vehicle for high lift work.

Therefore, the present examples and embodiments are to be considered as illustrative and not restrictive and the invention is not to be limited to the details given herein, but may be modified within the scope and equivalence of the appended claims.

What is claimed is:

1. An assembly for measuring yaw rate of a vehicle when mounted on the vehicle in a predetermined position relative to the vehicle, the assembly comprising:

a sensor for measuring yaw rate of the vehicle;

a lead wire for transmitting a signal from the sensor, wherein the lead wire has a sealed connection with the sensor and a connector which is attached to a distal end of the lead wire;

a control unit for controlling the vehicle based on the signal transmitted from the sensor, wherein the control unit includes a circuit board, and wherein the sensor is electrically connected to the circuit board with the connector;

a case for accommodating the circuit board, the case including a base for fixing the case to the vehicle;

a bracket supported by and located within the case, the bracket having a surface provided at a predetermined inclination relative to the circuit board, the sensor being mounted on the inclined bracket surface and maintaining its position relative to the vehicle when the case is fixed to the vehicle; and a lock mechanism controlled by the circuit board for locking the tilting motion of an axle of the vehicle.

2. An assembly according to claim 1, wherein the bracket includes first an second mounting pieces, which extend parallel to the circuit board, and a plate extending between the first and second mounting pieces, and wherein the sensor is located on the plate.

3. An assembly according to claim 2, wherein the plate is inclined at predetermined angle relative to the first and second mounting pieces.

4. An assembly according to claim 3, wherein the assembly further comprises a first spacer that is arranged between the first mounting piece of the bracket and the circuit board.

5. An assembly according to claim 4, wherein the assembly further comprises a second spacer that is arranged between the second mounting piece and the circuit board.

6. An assembly according to claim 5, wherein the first spacer has a different length than the second spacer.

7. An assembly according to claim 6, wherein the assembly further comprises a first screw for mounting the sensor on the bracket.

8. An assembly according to claim 7, wherein the assembly further comprises a second screw for mounting the bracket on the circuit board.

9. An assembly according to claim 2, wherein the first and second mounting pieces are planar and lie in two different parallel planes.

10. An assembly according to claim 2, wherein the first and second mounting pieces lie in the same plane.

11. An assembly for measuring yaw rate of a vehicle when mounted on the vehicle in a predetermined position relative to the vehicle, the assembly comprising:

a sensor for measuring a running state of the vehicle, the sensor having an operational axis, wherein the sensor includes a yaw rate sensor that measures the yaw rate based on a deflection from the operational axis;

a lead wire for transmitting a signal from the sensor, wherein the lead wire has a sealed connection with the sensor and a connector which is attached to a distal end of the lead wire;

a control unit for controlling the vehicle based on the signal transmitted from the sensor, wherein the control unit includes a circuit board, and wherein the sensor is electrically connected to the circuit board with the connector;

a case for accommodating the circuit board, the case including a base for fixing the case to the vehicle;

a bracket supported by and located within the case, the bracket having a surface provided at a predetermined inclination relative to the circuit board, the sensor being mounted on the inclined bracket surface and the axis of the sensor being maintained in a vertical position when the case is fixed to the vehicle; and a lock mechanism controlled by the circuit board for locking the tilting motion of an axle of the vehicle.

12. An assembly according to claim 11, wherein the bracket includes first and second mounting pieces, which extend parallel to the circuit board, and a plate extending between the first and second mounting pieces, and wherein the sensor is located on the plate.

13. An assembly according to claim 12, wherein the plate is inclined at predetermined angle relative to the first and second mounting pieces.

14. An assembly according to claim 13, wherein the assembly further comprises a first spacer that is arranged between the first mounting piece of the bracket and the circuit board.

15. An assembly according to claim 14, wherein the assembly further comprises a second spacer that is arranged between the second mounting piece and the circuit board.

16. An assembly according to claim 15, wherein the first spacer has a different length than the second spacer.

17. An assembly according to claim 16, wherein the assembly further comprises a first screw for mounting the sensor on the bracket.

18. An assembly according to claim 17, wherein the assembly further comprises a second screw for mounting the bracket on the circuit board.

19. An assembly according to claim 12, wherein the first and second mounting pieces are planar and lie in two different parallel planes.

20. An assembly according to claim 12, wherein the first and second mounting pieces lie in the same plane.

21. An assembly for measuring yaw rate of a vehicle when mounted on the vehicle in a predetermined position relative to the vehicle, the assembly comprising:

a sensor for measuring yaw rate of the vehicle, the sensor having an operational axis, wherein the sensor includes an acceleration sensor that measures the acceleration of the vehicle in the moving direction based on a deflection from the operational axis;

a lead wire for transmitting a signal from the sensor, wherein the lead wire has a sealed connection with the sensor and a connector which is attached to a distal end of the lead wire;

a control unit for controlling the vehicle based on the signal transmitted from the sensor, wherein the control unit includes a circuit board, and wherein the sensor is electrically connected to the circuit board with the connector;

a case for accommodating the circuit board, the case including a base for fixing the case to the vehicle;

a bracket supported by and located within the case, the bracket having a surface provided at a predetermined inclination relative to the circuit board, the sensor being mounted on the inclined bracket surface and the axis of the sensor being maintained in a horizontal position when the case is fixed to the vehicle; and a lock mechanism controlled by the circuit board for locking the tilting motion of an axle of the vehicle.

22. An assembly according to claim 21, wherein the bracket includes first and second mounting pieces, which extend parallel to the circuit board, and a plate extending between the first and second mounting pieces and being inclined at a predetermined angle relative to the first and second mounting pieces, wherein the sensor is located on the plate.

23. An assembly according to claim 22, wherein the first and second mounting pieces are planar and lie in two different parallel planes.

24. An assembly according to claim 22, wherein the first and second mounting pieces lie in the same plane.

25. An assembly for measuring yaw rate of a vehicle when mounted on the vehicle in a predetermined position relative to the vehicle, the assembly comprising:

a sensor for measuring yaw rate of the vehicle;

a control unit for controlling the vehicle based on a signal transmitted from the sensor, wherein the control unit includes a circuit board;

a case for accommodating the circuit board, the case including a base for fixing the case to the vehicle;

a bracket supported by and located within the case, the bracket having a surface provided at a predetermined inclination relative to the circuit board, the sensor being mounted on the inclined bracket surface and maintaining its position relative to the vehicle when the case is fixed to the vehicle; and a spacer detachably provided between the bracket and the case to thereby position the bracket at the predetermined inclination.

26. An assembly according to claim 25, wherein the bracket includes first and second mounting pieces, which extend parallel to the circuit board, and a plate extending between the first and second mounting pieces, wherein the sensor is located on the plate, and wherein the spacer includes a first spacer that is arranged between the first mounting piece of the bracket and the circuit board.

27. An assembly according to claim 25, wherein the bracket includes first and second mounting pieces, which extend parallel to the circuit board, and a plate extending between the first and second mounting pieces, wherein the sensor is located on the plate, and wherein the spacer includes a second spacer that is arranged between the second mounting piece and the circuit board.

* * * * *

UNITED STATES PATENT AND TRADEMARK OFFICE
CERTIFICATE OF CORRECTION

PATENT NO. : 6,398,252 B1　　　　　　　　　　　　　　　　　　　　　　　　　Page 1 of 1
DATED　　　 : June 4, 2002
INVENTOR(S) : Kazuo Ishikawa et al.

It is certified that error appears in the above-identified patent and that said Letters Patent is hereby corrected as shown below:

<u>Title page,</u>
Item [56], References Cited, FOREIGN PATENT DOCUMENTS, please add
-- JP 9-315125  12/1997 --

Signed and Sealed this

Sixth Day of July, 2004

JON W. DUDAS
*Acting Director of the United States Patent and Trademark Office*